UNITED STATES PATENT OFFICE.

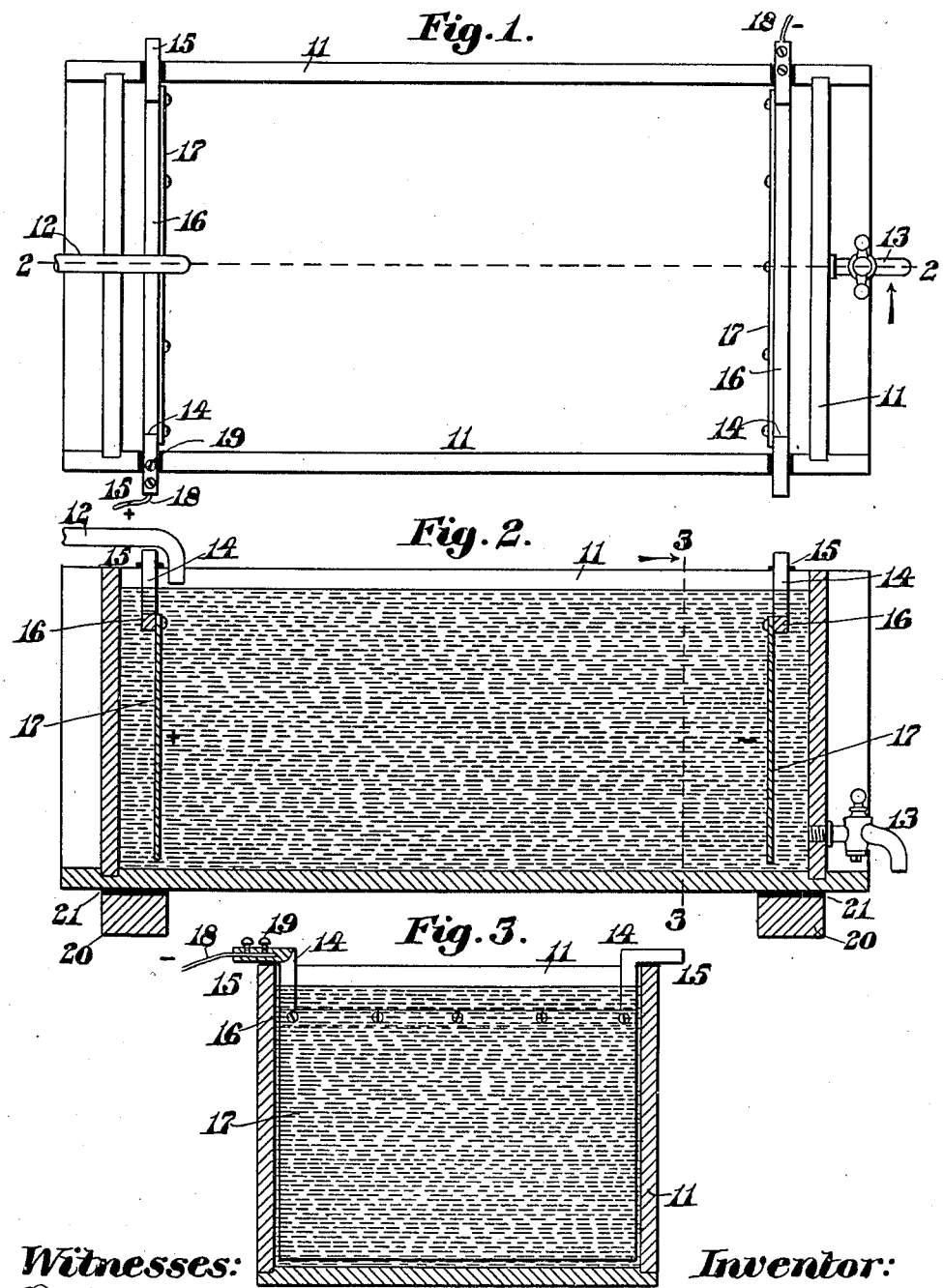

GEORGE D. BURTON, OF BOSTON, MASSACHUSETTS.

PROCESS OF TREATING SUGAR-CANE AND SIMILAR SUBSTANCES.

No. 909,987.   Specification of Letters Patent.   Patented Jan. 19, 1909.

Application filed October 17, 1906. Serial No. 339,335.

*To all whom it may concern:*

Be it known that I, GEORGE D. BURTON, a citizen of the United States of America, and a resident of Boston, in the county of Suffolk and State of Massachusetts, have invented certain new and useful Improvements in the Process of Treating Sugar-Cane and Similar Substances, of which the following is a specification.

This invention relates to methods of treating vegetable matter such as sugar cane, moriche, pina, caratas, mayaca, pita, cocuy, sansevieria, mauguay, banana, and corn stalks, tule, and similar grasses, rice, straw, flax, and fibrous substances, the leaves of palm, rubber, and pineapple plants, the fibrous parts of cocoa, sisal, and palmetto trees, and other similar substances such as jute, ramie, etc., to separate, degum, and bleach the fibers thereof and cause said fibers to be treated so that they may be used for commercial purposes and in the arts.

The invention consists in taking vegetable matter, subjecting it to pressure to separate the fibers thereof, immersing said vegetable matter in a bath consisting of an electrolytic solution containing saponaceous substances and a quantity of chlorid of sodium, sodium carbonate, or oxalic acid or similar chemical salts, and then raising the temperature of the bath from 60° to 212° F., more or less, and passing through the bath during a whole or part of such immersion a current of electricity, thereby acting upon the fibers to soften and strengthen them and make them capable of use for various commercial purposes.

In the operation of the invention a tank or vat is used similar to that shown in the drawings, forming part of this application, of which—

Figure 1 represents a plan view. Fig. 2 represents a longitudinal section thereof on line 2—2 on Fig. 1, and Fig. 3 represents a section on line 3—3 on Fig. 2, looking in the direction of the arrow.

Similar characters designate like parts throughout the several figures of the drawings.

In the drawings, 11 represents a tank or vat of any ordinary construction provided with an inlet pipe 12 for supplying water thereto and a faucet or cock 13 for withdrawing the solution from said tank when desired. A bent aluminum rod 14 crosses the upper end of the tank 11 and the ends 15 thereof are supported by the sides of said tank while the main cross member 16 thereof depends into said tank and extends from side to side thereof. This cross member is usually constructed of aluminum or some other good conducting material. Secured to this cross member 16 and extending nearly to the bottom of said tank is a metallic plate 17 forming a suitable electrode.

The member 14 is provided with a conducting wire 18 secured thereto by means of set screws 19. At the opposite end of said tank is a similar electrode. A current of electricity from any suitable source is caused to pass from one electrode to the other through the bath contained within said tank causing electrolysis. This bath consists of watery solution which is kept at a level above the upper ends of the electrodes 17, the supply being obtained through the inlet pipe 12.

In carrying out the present invention vegetable matter such as sugar cane, moriche, pina, caratas, mayaca, pita, cocuy, sansevieria, mauguay, banana, and corn stalks, tule, and similar grasses, and fibrous substances, the leaves of palm, rubber, and pineapple plants, the fibrous parts of cocoa, sisal, and palmetto trees, and other similar substances such as jute, ramie, straw, etc., is first taken and either boiled or subjected to pressure to remove the juices therefrom. Where pressure is applied to the fibers this may be done in any well known machine suitable for the purpose and where the juices are removed by boiling any suitable tank adapted for the purpose may be used.

The removal of the gum, oils, or juices from the fibers separate them to some extent and then the vegetable matter being treated is placed in a watery solution in a tank such as is shown in the drawings. A saponaceous substance such as castile soap is placed within said bath to which is added chemical salts such as sodium carbonate or oxalic acid, or borax, which saponaceous substance and chemical salts respectively soften the water and the fibers immersed therein, and also bleach and strengthen said fibers.

In order to increase the specific gravity of the bath, chemical salts, such as chlorid of sodium, sodium carbonate, or oxalic acid, or borax, are added to the bath in the proportion of one part of the first to two parts of the latter, or one part salts to two of acid, so that the specific gravity of the bath is increased from about 1.000 to 1.020, more or less, and an electric current may be passed through the bath during a whole or a part of the time that the material is being treated.

In some cases where the fibers are hard and tough it is desirable to add to the bath from five to eight per cent. of sulfuric acid, this acting upon the fibers to soften and open them, causing the gummy and sticky substances therein to be removed. This treatment of the fibers by sulfuric acid may take place during the action of the electric current thereon or precede it. When this has been accomplished the action of the electricity upon the fibers will strengthen, lengthen, and soften them.

The saponaceous substance in the bath cleanses the fibers and assists in bleaching and softening and strengthening them. When it is desired to use the fibers for the purpose of making rope or using the same as a binding material in the manufacture of paper, etc., it is often desirable to have the material bleached and in order to accomplish this a suitable bleaching compound is added to the bath such as oxalic acid, chlorid of lime or any other suitable agent. This will act upon the fibers to bleach them in such a manner as to make them adapted for use in the manufacture of white or light colored papers, hats, rope, etc.

The outer fibers of the vegetable matter used is usually intended to be utilized for the manufacture of paper and similar materials and in some cases in the manufacture of rope or binding twine. The inner fibers of the material may be utilized in the textile manufactures. In this case it is desirable that the fibers should be further treated to soften and strengthen them and give them an appearance of animal matter rather than vegetable matter. In order to accomplish this a tank such as is shown in the drawings is provided with a suitable bath capable of creating an electrolytic gas and wool or woolen fabrics are immersed in the same and a current of electricity applied to the bath and the materials immersed therein. When the dirt and grease have been thoroughly eliminated from the materials thus immersed said materials are removed from the bath and the solution drawn off into a separate vat and allowed to settle to free said bath from any impurities which may reside therein. After settling the solution may then be pumped back again into the first-mentioned tank and the vegetable fibers intended for use in the textile manufactures immersed therein. These fibers at this time have been sufficiently treated to thoroughly separate them from each other and are immersed in the solution in which the wool has been degreased and cleansed for about fifteen or twenty minutes, during which time a current of electricity may be permitted to pass through the solution and the vegetable matter contained therein. When this is done the vegetable or fibrous matter absorbs a certain amount of wool grease and animal matter or other oils and gives to said vegetable matter a softer appearance and strengthens its fibers in such a manner as to make it useful in the arts for various purposes. The fibers when so softened and strengthened in this manner are adapted to be spun into threads or yarns so that they may be used for weaving and for many other purposes.

The current of electricity employed may be obtained from any suitable source varying from seventy-five to five hundred volts and from five to five hundred amperes according to the size of the receptacle used and the quantity of material to be treated.

During the action of the electrolytic gas or gases upon the vegetable matter immersed in the bath in the tank the temperature of the solution contained within said tank is raised either by steam or electricity or other suitable means of heat to about two hundred degrees Fahrenheit, more or less, according to the substances being treated.

Vegetable oil, such as olive oil, may be used to soften the fibers instead of animal oil or grease, without altering the principles of this invention.

It is believed that from the foregoing the operation of the invention will be thoroughly understood without any further description.

Claims.

1. The process of treating vegetable matter of the class described, which comprises the removing of the juices therefrom, submerging the fibers thereof in a bath containing animal grease as from wool, adding to said bath a quantity of electrolytic chemical salts, heating the bath, and then passing through said bath a current of electricity while said fibers are immersed therein.

2. The process of treating vegetable matter of the class described, which comprises the removing of the juices therefrom, submerging the fibers thereof in a bath containing one part chlorid of sodium to about two parts sodium carbonate and animal grease, and then passing through said bath a current of electricity while said fibers are immersed therein.

3. The process of treating vegetable matter of the class described, which comprises the removing of the juices therefrom, submerging the fibers thereof in a bath containing sodium carbonate and animal grease, and then passing through said bath a current of electricity while said fibers are immersed therein.

4. The process of treating vegetable matter of the class described, which comprises the application of pressure to said vegetable matter to separate the fibers, submerging said fibers in a bath in which wool has been degreased and cleansed, adding to said bath a quantity of sodium carbonate, heating the solution, and then passing through said bath a current of electricity while said fibers are immersed therein.

5. The process of treating vegetable matter of the class described, which comprises the application of pressure to said vegetable matter to separate the fibers, submerging said fibers in a bath in which wool has been degreased and cleansed, adding to said bath a solution about one part chlorid of sodium to about two parts sodium carbonate, heating the solution, and then passing through said bath a current of electricity while said fibers are immersed therein.

6. The process of treating vegetable matter of the class described, which comprises the application of pressure to said vegetable matter to separate the fibers, submerging said fibers in a bath in which wool has been degreased and cleansed, adding to said bath a quantity of sodium carbonate, and then passing through said bath a current of electricity while said fibers are immersed therein.

7. The process of treating vegetable matter of the class described, which comprises the application of pressure to said vegetable matter to separate the fibers, submerging said fibers in a bath in which wool has been degreased and cleansed, adding to said bath a solution about one part chlorid of sodium to about two parts soda carbonate, and then passing through said bath a current of electricity while said fibers are immersed therein.

8. The process of treating vegetable matter of the class described, which comprises the application of pressure to said vegetable matter to separate the fibers, immersing said vegetable fibers in a solution containing wool grease, heating the solution, and passing through said bath a current of electricity while said vegetable fibers are immersed therein.

9. The process of treating vegetable matter of the class described, which comprises the application of pressure to said vegetable matter to separate the fibers, immersing said vegetable matter in a solution containing wool grease, and passing through said bath a current of electricity while said vegetable matter is immersed therein.

10. The process of treating vegetable matter of the class described, which comprises the application of pressure to said vegetable matter to separate the fibers, immersing said fibers in a bath containing animal grease from wool, adding thereto a quantity of sodium carbonate, and then passing through said bath a current of electricity while said vegetable fibers are immersed therein.

11. The process of treating vegetable matter of the class described, which comprises the application of pressure to said vegetable matter to separate the fibers, placing said vegetable matter in a suitable receptacle containing a solution composed of water, electrolytic chemical salts and animal grease, and passing through said solution and the vegetable matter contained therein a current of electricity.

12. The process of treating vegetable matter of the class described, which comprises the application of pressure to said vegetable matter to separate the fibers, placing said vegetable matter in a suitable receptacle containing a solution composed of water, electrolytic chemical salts and animal grease, and passing through said solution and the vegetable matter contained therein a current of electricity, said current of electricity being of sufficient pressure and volume to create in said solution electrolytic gas or gases.

13. The process of treating vegetable matter of the class described, which comprises the application of pressure to said vegetable matter to separate the fibers, placing said vegetable matter in a suitable receptacle containing a solution composed of water, electrolytic chemical salts and animal grease, and passing through said solution and the vegetable matter contained therein a current of electricity, thereby causing the vegetable fibers to absorb the animal grease or oil contained in said solution.

Signed by me at Boston, Mass., this 15th day of October, 1906.

GEO. D. BURTON.

Witnesses:
WALTER E. LOMBARD,
EDNA C. CLEVELAND.